United States Patent [19]

Fisher

[11] 4,258,253

[45] Mar. 24, 1981

[54] CARTRIDGE ASSEMBLY FOR DATA-SENSING SYSTEM

[76] Inventor: Charles R. Fisher, 34781 Glen Dr., Eastlake, Ohio 44094

[21] Appl. No.: 92,452

[22] Filed: Nov. 8, 1979

[51] Int. Cl.³ .................. G06K 7/00; G06K 7/06; G06K 7/08; G06K 7/14

[52] U.S. Cl. .................. 235/439; 235/443; 235/449; 235/458

[58] Field of Search .............. 235/435, 439, 443, 449, 235/458, 483

[56] References Cited

U.S. PATENT DOCUMENTS

| | | | |
|---|---|---|---|
| 3,769,552 | 10/1973 | Cook et al. | 235/435 |
| 3,953,712 | 4/1976 | Horvath | 235/449 |
| 4,112,292 | 9/1978 | Varvel et al. | 235/449 |

*Primary Examiner*—Daryl W. Cook

*Attorney, Agent, or Firm*—Watts, Hoffmann, Fisher & Heinke Co.

[57] ABSTRACT

The present invention relates generally to the field of data-sensing systems for identification and/or security purposes (data input), and more particularly relates to a new and novel cartridge assembly for use with data sensing systems of the type as may be applied to credit cards, security badges or the like. By the term, "card" is meant herein to include any type of media wherein it might be desirable to provide codes (invisible or otherwise) for identification and/or security purposes or any type of data input.

The cartridge assembly of the invention incorporates a new and novel "pluggable" cartridge unit adapted to receive a data carrier, such as a credit card, security card, or the like for automatic reading of coded information which is susceptible for use in a wide variety of applications.

9 Claims, 11 Drawing Figures

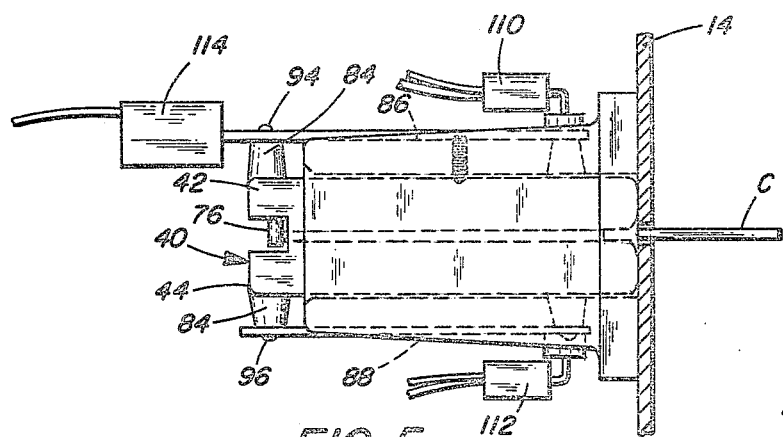
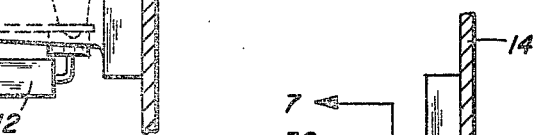
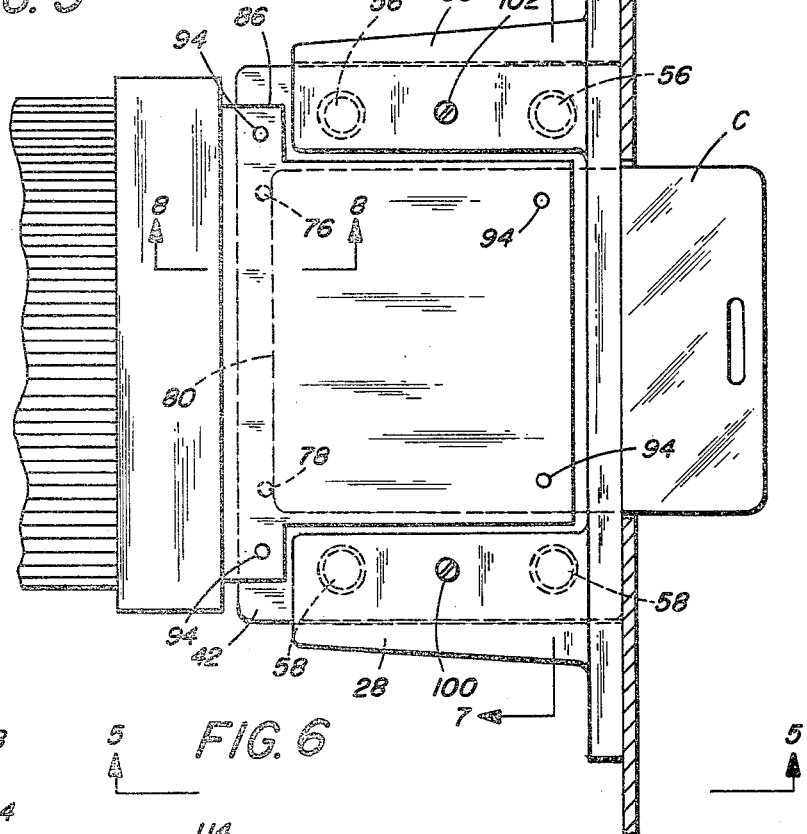
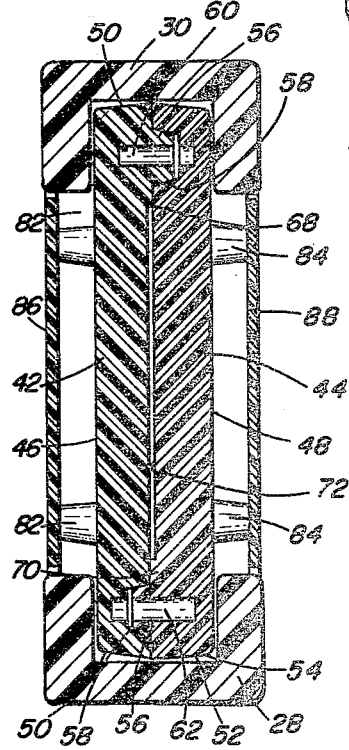
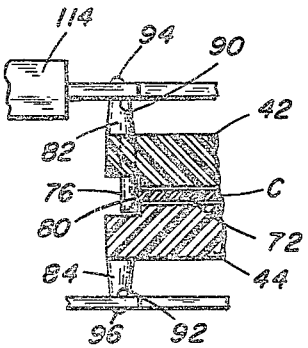

CARTRIDGE ASSEMBLY FOR DATA-SENSING SYSTEM

RELATED PATENTS

The inventor herein, Charles R. Fisher, is the inventor of U.S. Pat. No. 3,562,496 issued Feb. 9, 1971 for "DATA SENSING DEVICE". This patent relates to a data sensing device (card reader) which provides the automatic read-out of a data carrier, such as a punched card, by an electronic spark coupling method. Accordingly, the cartridge assembly of the present invention may be utilized with such type of card reader or with various other mechanical, electrical, optical or magnetic data sensing systems presently available on the market.

BRIEF DESCRIPTION OF THE PRESENT INVENTION

With the foregoing in mind, the present invention contemplates a new and novel construction for a cartridge assembly which is of a simple, yet rugged self-contained construction for ready attachment to any convenient support structure, such as a wall mounted console, desk mounted console, or the like.

As known in the art, the particular material on which information is to be stored and subsequently retrieved (decoded) is typically referred to as a card or badge; for example, a credit or security card. The card may, for example, be of the punched hole type identified in aforementioned U.S. Pat. No. 3,562,496 or may incorporate an array of indicia physically spaced on the card or medium provided for carrying coded information to render selected areas electrically more conductive than the remaining portions of the card. The areas selected define a code of the particular information to be stored in the card in much the same way that the particular selected areas punched out in a punched type card, as in U.S. Pat. No. 3,562,496, are utilized to store information. Accordingly, in the present invention the term, "card" is understood to include equivalent type media for use with readers, such as mechanical, electrical, optical or magnetic to provide coded information (invisible or otherwise) for identification and/or security purposes.

In the invention, the coded information on the card may subsequently be retrieved or read so as to provide electrical signals corresponding to the selected indicia (i.e. points). These signals can then be used to operate any suitable read-out or print-out device to display the information originally defined by the code in the card. Similarly, these same signals can also be used to feed the input into a computer, memory bank or other equipment in order to yield the information.

In the present invention, the cartridge assembly generally incudes a receptacle unit adapted to removably receive and mount a read-head cartridge unit on a suitable support structure, such as on a wall or desk console. The receptacle unit may include a pair of oppositely disposed, laterally spaced generally C shaped guide blocks to slidably receive and resiliently lock the cartridge unit in the installed position. The cartridge unit itself may be made from two oppositely disposed read-head members which define a slot or passage therebetween for slidably receiving a card to be read. Each of the read-head members includes a pre-determined array of apertures adapted to receive electrical contacts from electrical control members (PCB) mounted in superimposed relation on each of the read-head members. This array defines an area corresponding to an area of a portion of the card on which the information has been recorded. The electric control members may be connected to a suitable source of electrical power with one of the members being connected in circuit to a computer, memory bank or other equipment in order to yield the information, as desired. Accordingly, in the present invention it will be understood that any number or arrangement of electrical contacts in the array may be provided. For example, the selection of various points can be effected in a binary fashion so that thousands of bits of information can readily be coded on the card. The read-out would then simply convert the binary code into its original form to display the original information coded. In this respect, the carriage assembly of the present invention would be compatible with conventional type computer equipment presently available on the market.

In addition to the foregoing, it will be seen that the present invention provides a simple yet rugged construction of a cartridge assembly which utilizes a cartridge unit that can be quickly and easily "plugged" in for automatic read-out within a matter of microseconds. The cartridge assembly is constructed and arranged so that a consistent registration of the array of electrical contacts relative to a given area on the card is maintained. This arrangement provides a simple yet unique design which obviates the need for on-site repairs so as to minimize maintenance problems and extensive or unanswered service calls. Accordingly, this unique design reduces inconvenient down-time and enables relatively unskilled personnel to render periodic cleaning and maintenance of the component parts by simply "popping" out the reader cartridge when necessary. By this unique design, there is provided a self-contained unit which conveniently lends itself to relatively simple installation for wall or desk mounted console applications.

Due to the simplicity of the reader cartridge construction, no tools or special technical skill is required to replace or clean the reader cartridge. It is merely required that the cable connectors be disconnected with release of detent pins to enable the cartridge to be pulled out of the mounting. In addition, there is no need for concern as to which side of the card or badge, front or back, must be facing up, as the cartridge for the reader will accept a valid card or badge either side up.

BRIEF DESCRIPTION OF THE DRAWINGS

FIG. 5 is a fragmentary, generally horizontal section view, on reduced scale, taken along the line 5—5 of FIG. 6;

FIG. 6 is a fragmentary, top-plan view, partially in section, illustrating the cartridge assembly of the present invention;

FIG. 7 is a vertical cross-sectional view taken along the lines 7—7 of FIG. 6;

FIG. 8 is a fragmentary, horizontal view taken along the line 8—8 of FIG. 6.

DESCRIPTION OF THE PREFERRED EMBODIMENTS

Figure 1:
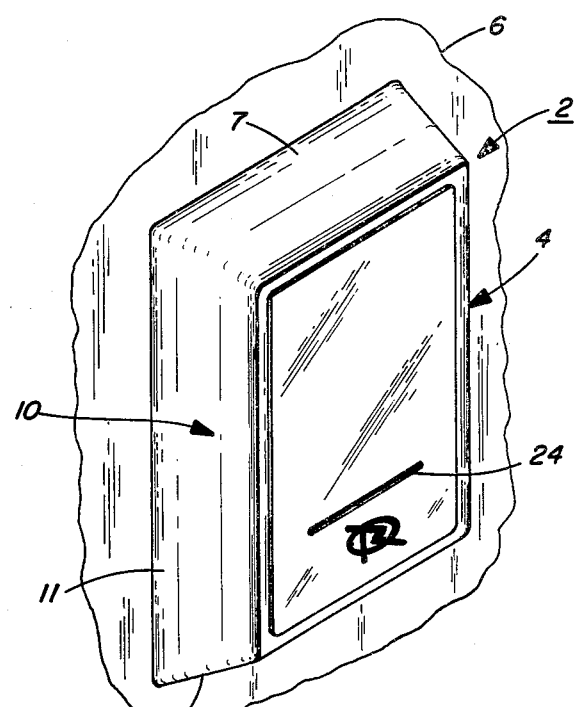
FIG. 1 is a generally perspective view illustrating the console unit of the present invention.
Figure 2:
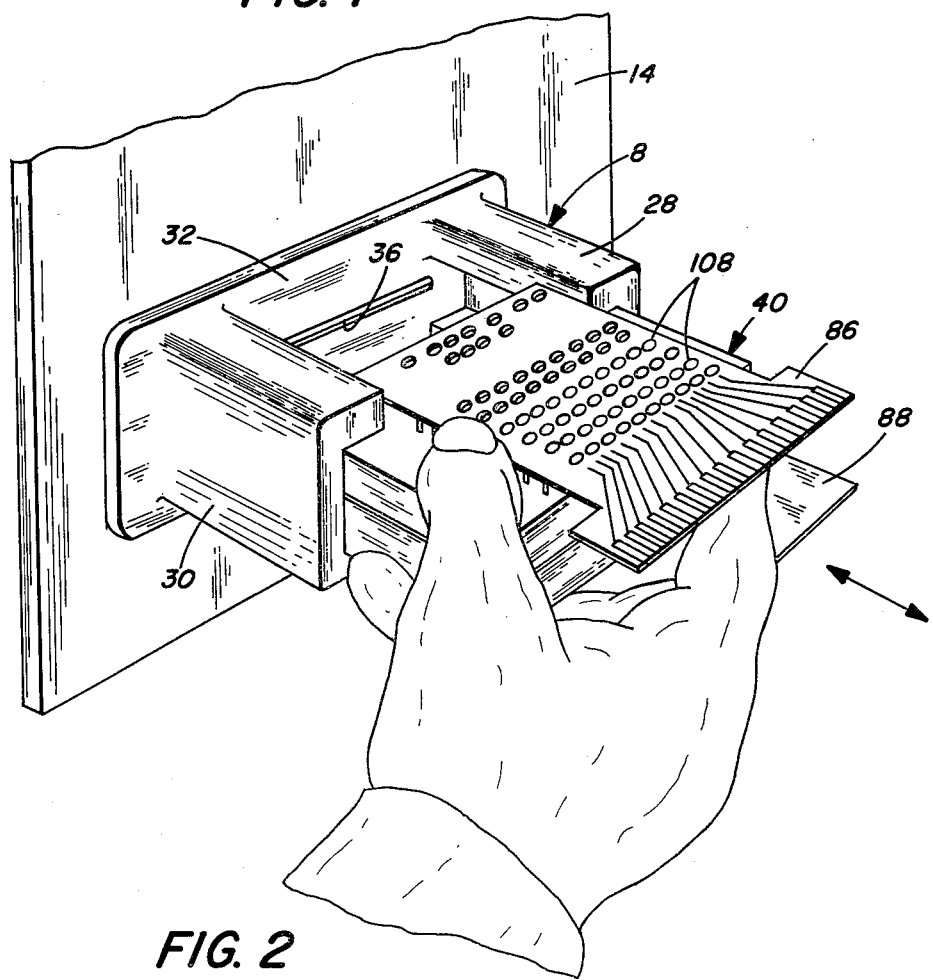
FIG. 2 is a generally perspective, fragmentary view illustrating the cartridge assembly mounted on the interior of the door of the console unit of FIG. 1 in the open position.
Figure 3:
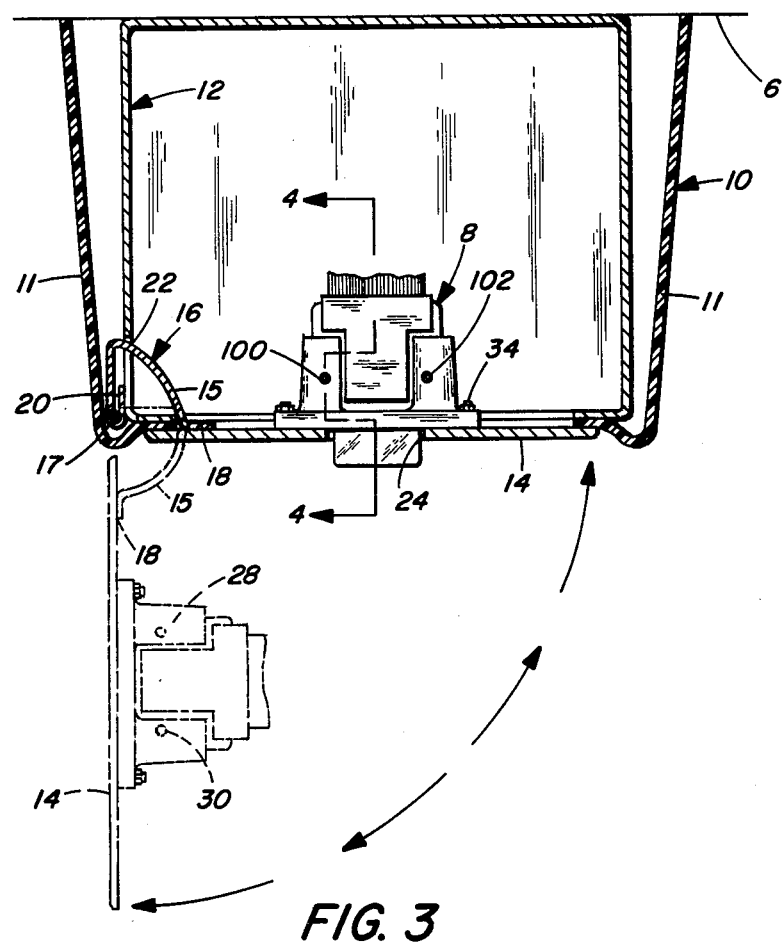
FIG. 3 is a fragmentary horizontal section view on an enlarged scale of the console unit of FIG. 1 illustrating the door of the console mounting the carriage assembly in a broken-line open position.

Referring again to the drawings and in particular to FIGS. 1, 2 and 3, thereof, there is illustrated the data-sensing device, designated generally at 2, which provides a data input terminal in accordance with the invention. In the form shown, the device is of a wall mounted type adapted to receive a data carrier, such as a security card, a personnel badge or other such identification card, as desired. It will be understood, however, that the device may not only be wall mounted, but may be constructed and arranged for any convenient installation, such as desk top or the like.

In the invention, the data-sensing device 2 includes a hollow console unit 4 which may be quickly and easily wall mounted, as at 6, for housing interiorly thereof a cartridge assembly, designated generally at 8, for receiving a data card C (FIG. 4) for electronic reading by a card reader of the type described in the aforementioned U.S. Pat. No. 3,562,496. It is to be recognized, however, that the cartridge assembly 8 of the present invention can be advantageously utilized with other types of data sensing systems such as mechanical, electrical, magnetic or optical as aforesaid.

Now in accordance with the invention, the console 4 includes an outer frustrol-conical unitary housing 10 which may be affixedly mounted on the wall, as at 6. This outer housing 10 may be of any suitable configuration made from any suitable material, such as high impact plastic or the like so, as to be substantially impervious to all ordinary industrial contaminants.

The console may include an inner box-like casing 12 which may be of a metallic construction (FIG. 3) defined by integrally inclined top, bottom and side walls, as at 7, 9 and 11. An access door 14 is mounted on the outer housing 10 via a metallic concealed hinge assembly 16 which may be integrally attached at one end, as at 18, to the door 14 and its other end, as at 20, by a return formed leaf attached to the confronting outer surface of the casing 12. The assembly 16 may extend axially through a slot 22 provided in one of the side walls of the casing 12. By this arrangement, the door 14 may be quickly and easily opened and then automatically returned to its closed position under the influence of the concealed hinge assembly 16.

Figures 10, 11:
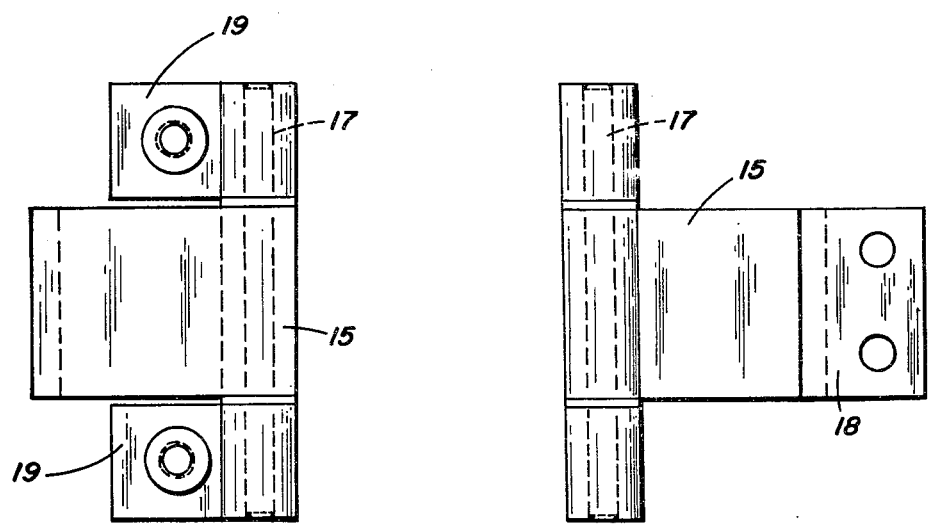
FIG. 10 is a front elevation view of a hinge assembly of the invention.
FIG. 11 is a side elevation view of the hinge assembly.

In the invention, the hinge assembly 16 is of a novel construction in that it provides a concealed hinge design, as best seen in FIGS. 3, 10 and 11. As shown, the assembly 16 includes a main leaf 15 of a curved configuration with an integral flange 18 which may be fixed to the casing 12, as aforesaid. The leaf is mounted on a pin-hinge 17 which also mounts a pair of end leaf members 19. The pin-hinge 17 is attached via the end leaf members 19 to the casing such that the main leaf 15 which is attached to the door can pivot through the slot 22 provided in the casing. In this case, there are two such hinge assemblies, one at the top and one at the bottom of the console.

Figure 4:
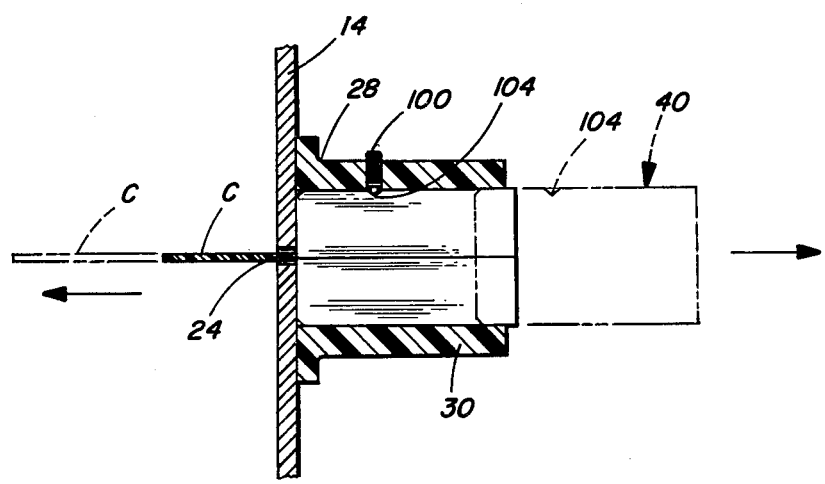
FIG. 4 is a fragmentary, enlarged vertical section view taken generally along the line 4—4 of FIG. 3.

As best seen in FIG. 4, the access door 14 may be provided with a horizontally extending slot, as at 24, adapted to receive a data carrier C, such as a security card, badge or the like. In accordance with the invention, therefore, the user need only insert the card C into this slot in the console and into the cartridge assembly of the reader so as to actuate the microprocessor (not shown) of the system for any data collection, as desired.

The cartridge assembly 8 (FIG. 2) may be mounted centrally on the interior surface of the access door 14 by means of a pair of oppositely disposed, generally C-shaped guide blocks 28 and 30 integrally connected via a base plate 32 by means of suitable fasteners, as at 34 to the door 14, as best seen in FIG. 3. The blocks 28 and 30 and plate 32 may be molded as one unitary piece, as desired. This provides a receptacle that may be conveniently attached to a support structure, such as a console door or the like. The base plate 32 may be provided with a slot 36 (FIG. 2) to provide an access opening in general alignment with the slot 24 provided in the access door 14 for receiving the data card C therein. By this arrangement, the entire cartridge assembly 8 may be swung out, as a unit, with and upon opening of the access door, as best illustrated in dotted line in FIG. 3.

Now in accordance with the invention, the cartridge assembly 8 includes an interchangeble cartridge unit, designated generally at 40, which carries the input electronics for electronic read-out of the data coded upon the data card C. In the embodiment shown, the cartridge unit 40 may comprise a pair of oppositely disposed read-head plate members 42 and 44 (FIG. 7) of mating construction adapted to receive a data card C therebetween, as best seen in FIGS. 5 and 6. It will be understood, however, that the cartridge unit could be made in one piece in accordance with the invention.

In the embodiment shown the plate members 42 and 44 may be made of any suitable high-impact material, such as of a plastic composition or the like. As shown, the plate members 42 and 44 may be of a polygonal construction having generally flat outer surfaces 46 and 48 (FIG. 7) with inclined end surfaces, as at 50 and 52, so as to provide a slight clearance, as at 54, to facilitate a free sliding movement in and out of the associated guide blocks 28 and 30.

The interior surfaces of the members 42 and 44, in the form shown, may be provided with integral bosses (male) 56 for interlocking engagement in aperture (female) 58 for a press-fit connection to hold the members together in superposed relation, as best seen in FIGS. 6 and 7. The bosses may be hollow, as at 60, with two bosses located on one end of one plate member for insertion in two apertures in the corresponding end of the other plate member. The plate members 42 and 44 are further provided adjacent the male bosses 56 with integral shoulder portions, as at 68 and 70, so as to provide a lateral spacement between the plate members to provide a space, as at 72, therebetween for receiving the data card C. In the invention, the slot or space 72 is dimensioned so as to receive the data card C in a relatively close fitting relationship so as to prevent lateral shifting of the card upon insertion and/or removal of the same and to accurately position the card for precise read-out by the electronics of the system.

In the invention, the plate members 42 and 44 are provided adjacent their rear ends with a pair of laterally spaced, off-set pins 76 an 78 (FIGS. 7 and 8) which provide abutment or stop surfaces for limiting axial inserting movement of the data card C into the slot 72 between the plate members 42 and 44. One pin, as at 76, may depend from one plate member 42 while the other pin 78 may depend from the other plate member 44. By this arrangement, the rearward most surface, as at 80, of the data card C can be controllably inserted into the slot 72 so as to be in effective working alignment for accurate read-out by the electronics of the system. The card may be of the punched hole type or with other equivalent indicia media to provide an array which defines an area of information to be read, as aforesaid.

Now in accordance with the invention, each of the plate members 42 and 44 may be provided with a plurality of laterally spaced, upstanding posts 82 and 84, respectively, for mounting a pair of oppositely disposed electronic control members, printed circuit boards, (PCB) in laterally spaced relation, as at 86 and 88, thereon. As shown, the posts 82 and 84 have flats, as at 90 and 92, to provide a supporting surface for the respective control members 86 and 88. To provide a further securement, the upper ends of the posts may be provided with terminal pins, as at 94 and 96, which may be slip-fit and secured, such as by an adhesive, into corresponding apertues provided in the control members 86 and 88. By this arrangement, the control members are securely held in an electrically insulated relation from the read-head members 42 and 44.

In the invention, a resilient locking means may be provided to prevent withdrawal of the cartridge member 40 from the inserted position between the guide blocks 28 and 30. For this purpose, each of the guide blocks 28 and 30 may be provided on their upper sides by a resilient plunger element, as at 100 and 102, adapted for snap-action interlocking engagement within a corresponding recess portion 104 (only one shown) provided in one of the plate members 42, as best seen in FIGS. 3, 4 and 6.

Preferably, each of the read-head members 42 and 44 is provided with an array of electrical terminals (electrodes), as at 106, which correspond in number with an array of electrical solder connections 108 (FIG. 2) provided on each of the respective electric control members 86 and 88 (PCB) which, in turn, define an area corresponding to the area of a portion of the card C on which information is recorded and/or is to be read. Each of the electric control members 86 and 88 may be provided with a Hall effect sensor and sensors as at 110 and 112, which may apply a given voltage to a suitable control circuit provided in the control members which may comprise the printed circuits, as desired. One of the electric control members may be provided with an electrical connection, as at 114 so that the signals provided can be used to feed the input to a computer, memory bank, or other equipment in order to yield the information, as desired.

Figure 9:
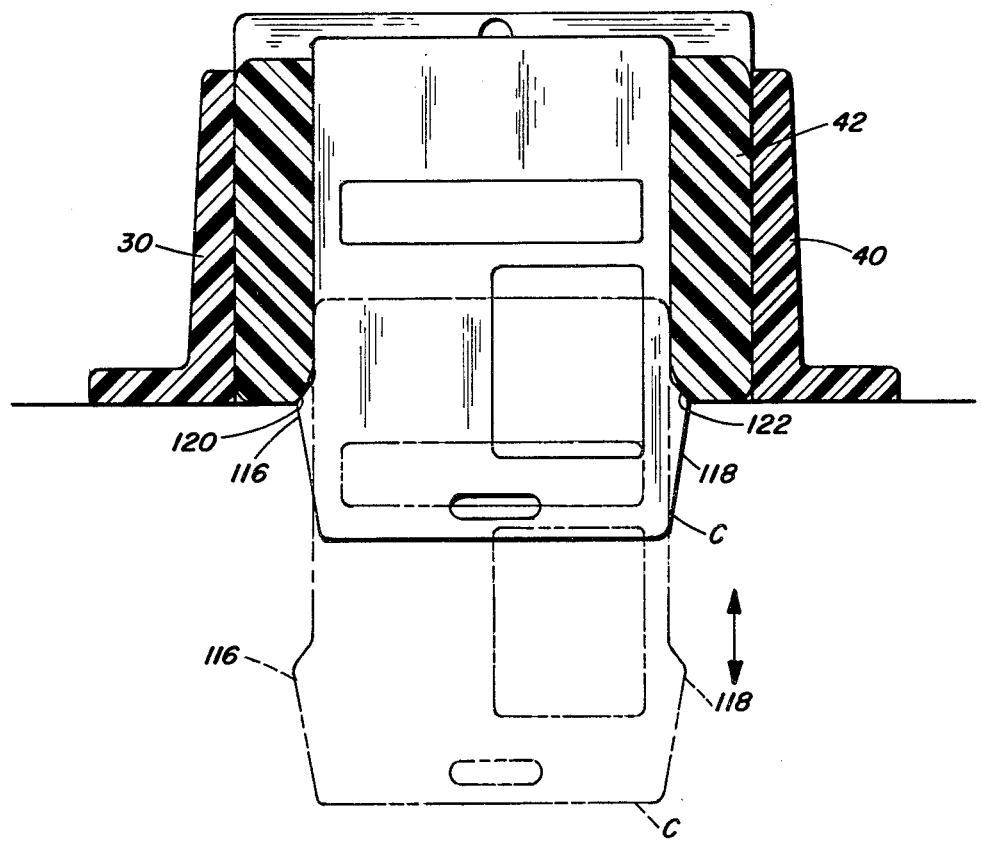
FIG. 9 is a top plan view, partly in section, illustrating a modified card or badge construction.

The card or badge C is constructed of a polymeric material though the indicia media may be made of other materials, such as paper, in accordance with the invention. As shown in FIG. 9, the card or badge C may have a modified construction being polygonal, rectangular, but with a pair of oppositely disposed, integral wings, as at 116 and 118, which abut against the interior surfaces, as at 120 and 122, of the plate members 42 and 44 which define the opening or slot 72 that receives the card C.

By this arrangement, one could omit the use of the stop pins 76 and 78, for example, if desired.

I claim:

1. A cartridge assembly adapted for use in a data-sensing system of the type for reading coded information on a data carrier, such as a credit card, security card or other such identification card, comprising:
   receptacle means adapted to be mounted on a support means;
   cartridge means adapted to be removable inserted into said receptacle means;
   said cartridge means mounting selectively interchangeable electric control circuit means adapted for connection to power means; and
   said carriage means adapted to removably receive a data carrier means for automatic electronic read-out upon operably coaction with said cartridge means.

2. A cartridge assembly in accordance with claim 1, wherein said cartridge means includes an oppositely disposed pair of read-head members adapted to be connected in superimposed relation to provide an electronic control passage therebetween and adapted to removably receive said data carrier means, and
   said electronic control circuit means including an electronic printed circuit means operably associated with each of said reader head members.

3. A cartridge assembly in accordance with claim 2, wherein,
   each of said reader head members includes a predetermined number of electrical terminals extending therethrough for electronically communicating said printed circuit means with said data carrier means.

4. A carriage assembly in accordance with claim 3, wherein,
   said data carrier means is selected from the group comprising credit cards, security cards, personnel badges or other such identification cards.

5. A cartridge assembly in accordance with claim 2, wherein,
   said receptacle means includes an oppositely disposed pair of guide block members adapted to be attached to a support structure.

6. A cartridge assembly in accordance with claim 1, wherein,
   resilient locking means operably coacting between said receptacle means and said cartridge means for resiliently holding said cartridge means in the assembled position thereof.

7. A cartridge assembly in accordance with claim 1, including
   abutment means disposed on said cartridge means adapted for limiting axial movement and registering said data carrier.

8. A carriage assembly adapted for use with a data-sensing system comprising,
   a receptacle means adapted for detachable connected to a support structure,
   cartridge means adapted for removable insertion into said receptacle means,
   said cartridge means including a pair of oppositely disposed generally mating read-head members connected together in superposed relation to provide a recessed slot therebetween for receiving a data card,
   said read-head members each including an array of electrical contact means which generally defines an area corresponding to the area of a portion of the data card to be read, and an electric control member associated with each of said read-head members for selectively reading the information on said data card upon energization from a power source.

9. A cartridge assembly in accordance with claim 3, wherein, said data carrier means includes wing means adapted for abutting engagement with said read-head members for limiting axial movement of said data carrier means.

* * * * *